(12) United States Patent
Jerstrom et al.

(10) Patent No.: US 6,585,629 B2
(45) Date of Patent: Jul. 1, 2003

(54) ROLLING PIN WITH COUNTERWEIGHTED ECCENTRIC HANDLES

(75) Inventors: Goeran Jerstrom, New York, NY (US); Allen Zadeh, Brooklyn, NY (US); Mark D. Prommel, Brooklyn, NY (US)

(73) Assignee: WKI Holding Company, Inc., Reston, VA (US)

( * ) Notice: Subject to any disclaimer, the term of this patent is extended or adjusted under 35 U.S.C. 154(b) by 0 days.

(21) Appl. No.: 09/760,435

(22) Filed: Jan. 12, 2001

(65) Prior Publication Data

US 2002/0094921 A1 Jul. 18, 2002

(51) Int. Cl.⁷ ................................................ B05C 1/08
(52) U.S. Cl. ................................. 492/14; 7/111; 492/13
(58) Field of Search .............................. 492/14, 16, 13, 492/19; 7/111; 30/307; 601/120; 29/895.2, 895.22, DIG. 901; 366/69; 15/143.1, 145, 144.1

(56) References Cited

U.S. PATENT DOCUMENTS

| 47,979 | A | | 5/1865 | Phillips | |
|---|---|---|---|---|---|
| 50,528 | A | | 10/1865 | Witsil | |
| 78,135 | A | | 5/1868 | Roof | |
| 154,582 | A | | 9/1874 | Carroll | |
| 220,669 | A | | 10/1879 | Scarborough | |
| 353,177 | A | | 11/1886 | Taylor | |
| 643,780 | A | * | 2/1900 | Pitcher ......................... | 492/14 |
| 1,158,111 | A | * | 10/1915 | Ahlheim ....................... | 492/14 |
| 1,810,050 | A | * | 6/1931 | Klempp ........................ | 492/14 |
| 2,208,729 | A | | 7/1940 | Offutt | |
| 2,633,815 | A | | 4/1953 | Duskey | |
| 2,683,428 | A | * | 7/1954 | Neal ............................ | 492/14 |
| 2,721,524 | A | | 10/1955 | Osborn | |
| 3,001,682 | A | * | 9/1961 | Carroll et al. ................ | 492/16 |
| 3,322,076 | A | | 5/1967 | Cronheim | |
| 3,565,014 | A | | 2/1971 | Mendoza | |
| 3,600,956 | A | * | 8/1971 | Boguth ......................... | 74/61 |
| 3,653,338 | A | | 4/1972 | Sauey | |
| 3,831,238 | A | | 8/1974 | Adams | |
| 3,847,144 | A | * | 11/1974 | Wright ....................... | 601/120 |
| 3,935,750 | A | * | 2/1976 | Maroth ......................... | 74/61 |
| 4,070,742 | A | | 1/1978 | Dorfman | |
| 4,107,830 | A | | 8/1978 | Thomson | |
| 4,426,200 | A | | 1/1984 | Muller | |
| 5,081,885 | A | * | 1/1992 | Shaffer ........................ | 74/640 |
| 5,217,369 | A | * | 6/1993 | Brown et al. ............... | 432/250 |
| 5,577,995 | A | * | 11/1996 | Walker et al. .............. | 601/120 |

FOREIGN PATENT DOCUMENTS

| CH | 672972 A5 | * | 1/1990 | .................. 492/14 |
|---|---|---|---|---|
| DE | 296 21 216 U1 | | 2/1997 | |

* cited by examiner

*Primary Examiner*—Gregory Vidovich
*Assistant Examiner*—Marc Jimenez
(74) *Attorney, Agent, or Firm*—Seyfarth Shaw

(57) ABSTRACT

A rolling pin has a hollow cylindrical metal roller rotatable relative to an elongated shaft assembly extending axially through the roller, the shaft assembly having two rods respectively rotatably journaled in bushing portions of end caps on the roller, the two rods having their inner ends fitted in recesses in a weighted coupler disposed within the roller, and having outer ends offset from the rotational axis and connected to handles, each of which handles has a rounded side and a flattened side. The weight causes the handles to be disposed in an at-rest position with most of each handle disposed above the rotational axis and with the flattened sides of the handles facing downwardly.

13 Claims, 4 Drawing Sheets

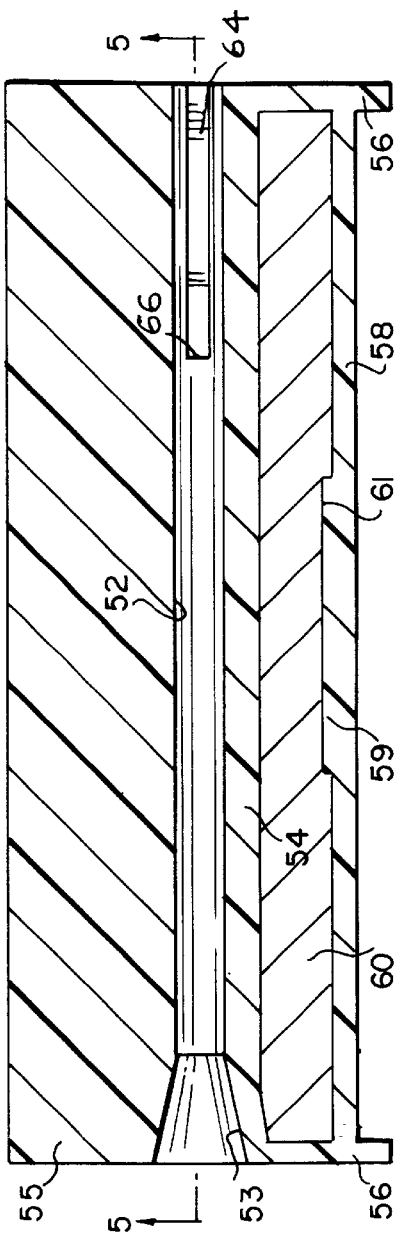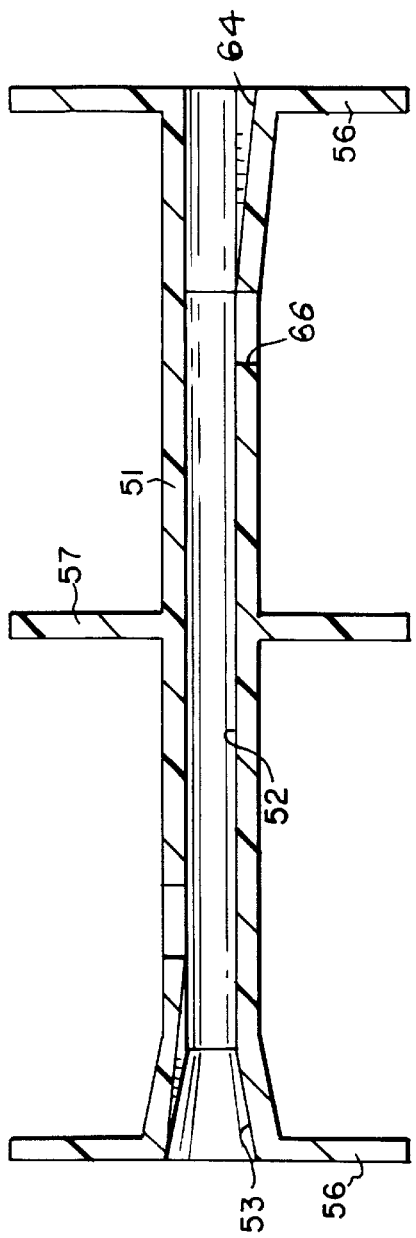
FIG. 4
FIG. 5

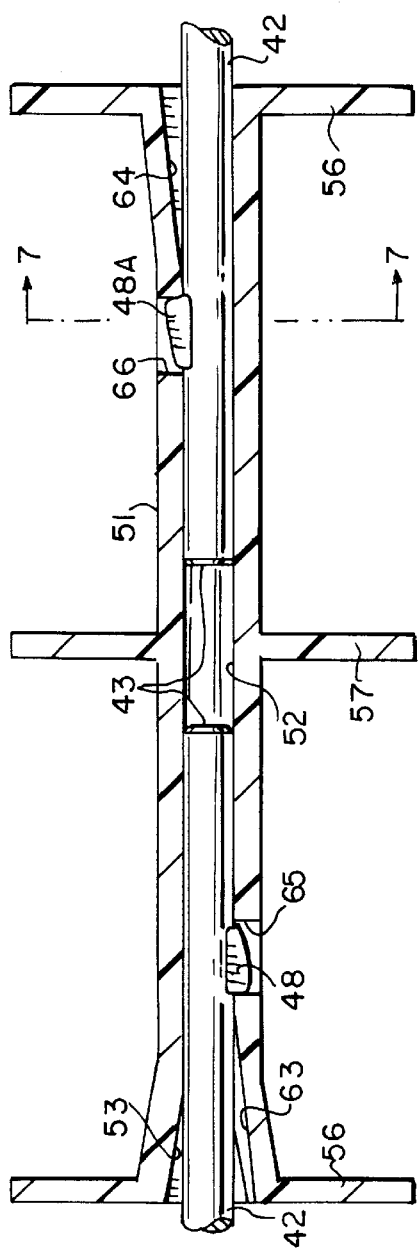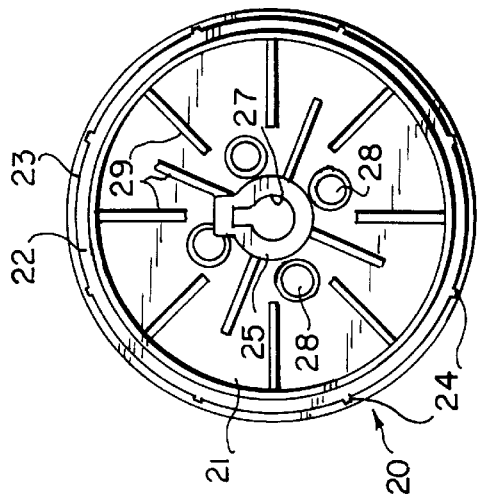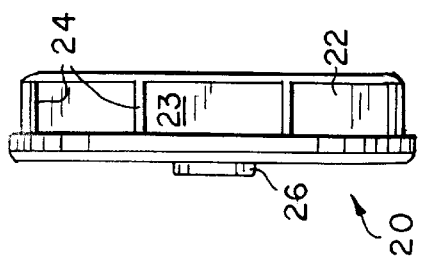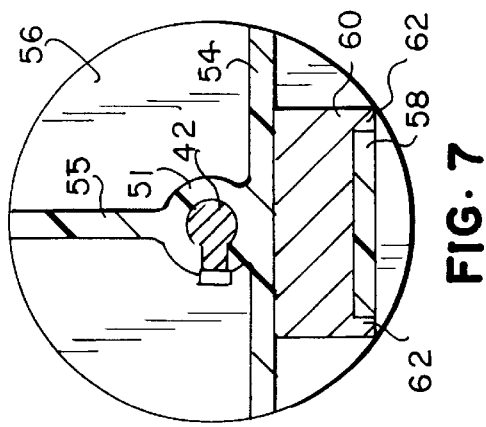

ROLLING PIN WITH COUNTERWEIGHTED ECCENTRIC HANDLES

BACKGROUND

This Application relates to improvements in rolling devices, particularly cooking utensils of the type known as rolling pins, wherein a roller has handles projected axially outwardly from the opposite ends thereof, the handles being interconnected for rotation in unison relative to the roller.

Rolling pins are commonly used in two operational modes. In one mode, the user's hands respectively grasp the handles, with the fingers curled under the handles to move the roller back and forth away from and toward the user. Sometimes, when it is desired to exert additional downward force on the item being rolled, the user places the flattened palms of the hands on top of the handles. However, in this latter mode, the handles, which are typically cylindrical in shape, have a tendency to roll relative to the user's hands. It is known to provide roller pin handles with flattened sides to inhibit rolling of the handles relative to the user's hands, one such arrangement being disclosed in U.S. Pat. No. 2,633,815.

However, the flattening removes material from the handles, causing them to be mounted eccentrically relative to the axis of rotation of the roller so that, in the at-rest position, the heavier bottoms of the handles rotate downwardly so that the flattened surfaces face upwardly. Thus, for standard operation, which occurs most of the time, the user must first rotate the handles 180° to a use position wherein the flattened surfaces face downwardly, so as to provide more clearance for the user's fingers which are curled beneath the handles.

SUMMARY

This application discloses an improved rolling pin construction which avoids disadvantages of prior constructions while affording additional structural and operating advantages.

An important aspect is the provision of a rolling device of the type which has eccentrically mounted handles with flattened sides which will rest with the flattened sides facing downwardly.

In connection with the foregoing aspect, another aspect is the provision of a rolling device of the type set forth, wherein the handles are biased to the at-rest position.

A still further aspect is the provision of a rolling device of the type set forth, wherein the handles are connected to a multi-part shaft assembly.

In connection with the foregoing aspect a further aspect is the provision of a rolling device of the type set forth which utilizes a hollow roller, the parts of the shaft assembly being joined together internally of the roller.

Certain ones of these and other aspects of the invention may be attained by providing a rolling device comprising an elongated roller having a longitudinal axis, two handles respectively coupled to the roller at opposite ends thereof for rotation relative thereto about the axis, each of the handles being coupled to the roller eccentrically with respect to the axis so as to be rotatable between a first position wherein most of the handle is disposed above the axis and a second position wherein most of the handle is disposed below the axis, and a counterweight coupled to the handles for biasing the handles to the first position.

Still further aspects may be attained by providing a rolling device of the type set forth, wherein the device includes an elongated shaft assembly extending longitudinally through the roller for rotation relative thereto, the shaft assembly including two parts coupled together independently of the roller and respectively connected to the handles.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following claims, the subject matter sought to be protected, its construction and operation, and many of its advantages should be readily understood and appreciated.

FIG. 4 is a further enlarged sectional view of the coupler and counterweight of the rolling pin of FIG. 3;

FIG. 5 is a sectional view taken generally along the line 5—5 in FIG. 4;

FIG. 6 is a view similar to FIG. 5, with the shaft assembly rods installed;

FIG. 7 is a view taken generally along the line 7—7 in FIG. 6 and rotated 90° counterclockwise;.

FIG. 8 is a front elevational view of one of the end caps of the rolling pin of FIG. 3; and FIG. 9 is a rear or inner end elevational of the end cap of FIG. 8.

DETAILED DESCRIPTION

Figure 1:
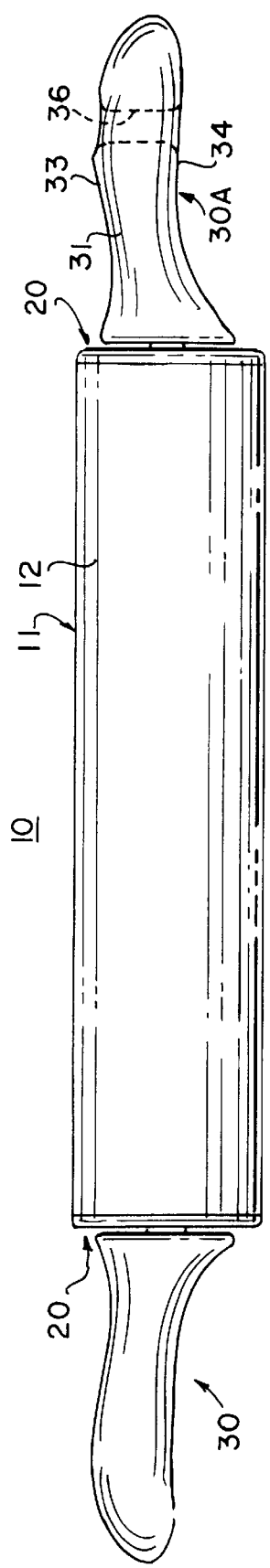
FIG. 1 is a front elevational view of a rolling pin embodiment.
Figure 2:
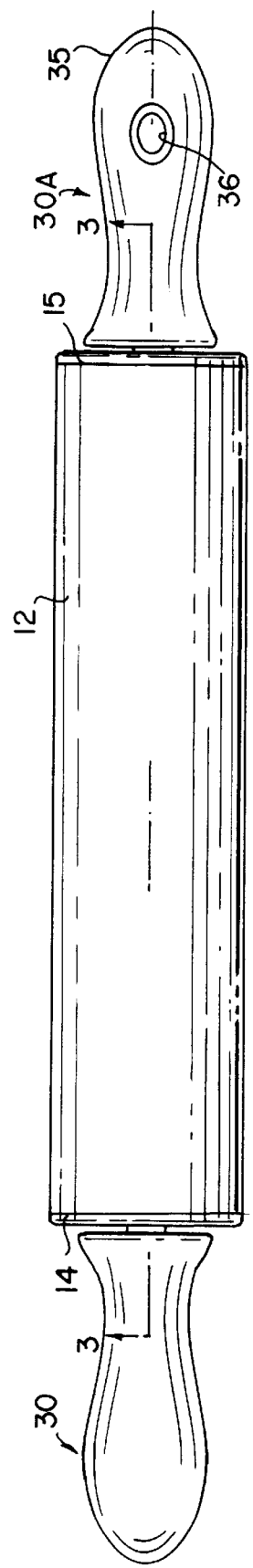
FIG. 2 is a top plan view of the rolling pin of FIG. 1.
Figure 3:
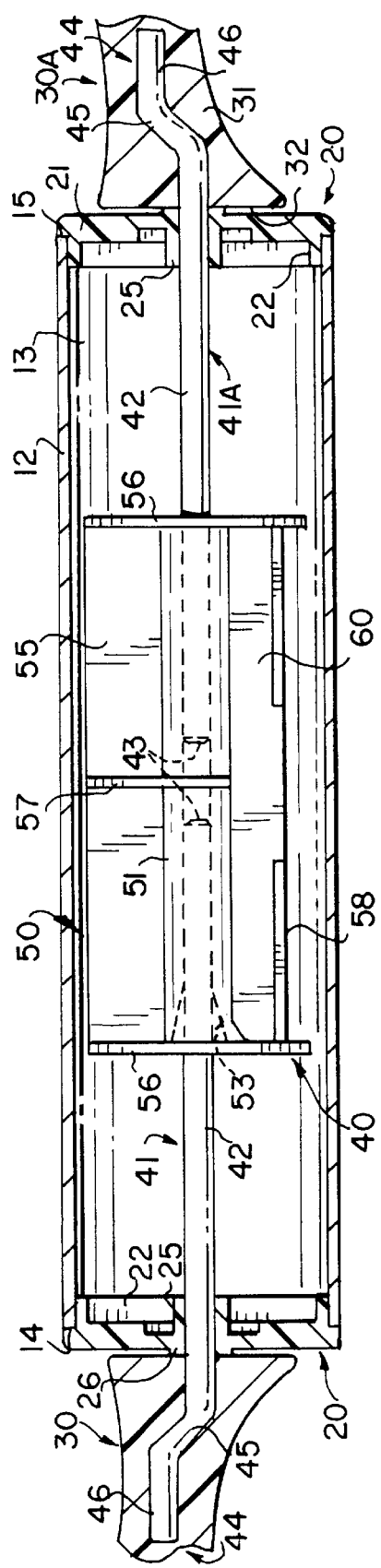
FIG. 3 is an enlarged, fragmentary view in vertical section, taking generally along the line 3—3 in FIG. 2.

Referring to FIGS. 1–3, there is illustrated a rolling device, viz., a rolling pin 10 having a hollow roller 11 with a circularly cylindrical wall 12 defining an inner space 13 and having opposite ends terminating, respectively, at end edges 14 and 15. The roller 11 may be formed of a suitable metal, such as a suitable steel, provided with a non-stick coating on the outer surface.

The opposite ends of the roller 11 are closed by end caps 20, which are substantially identical in construction, wherefore only one will be described in detail. Referring also to FIGS. 8 and 9, each end cap 20 has a circular end wall 21 provided adjacent to its outer edge with a axially extending cylindrical wall 22 having an annularly recessed outer surface 23 provided with circumferentially spaced, radially outwardly projecting ribs 24. The end cap 20 is provided centrally of the end wall 21 with a generally cylindrical bushing 25, which projects in the direction of the cylindrical wall 22 substantially to the end of the cylindrical wall 22, and projects a slight distance in the other direction to define a angular boss 26. The bushing 25 has a cylindrical bore therethrough defining a bearing surface 27, with a rectangular notch 27a therein and extending radially outwardly. Formed through the end wall 21 at equiangularly spaced-apart locations around the bushing 25 are four circular drain holes 28. Formed on the inner surface of the end wall 21 and projecting a slight distance axially therefrom is a plurality of reenforcing ribs 29, some of which extend radially inwardly from the cylindrical wall 22, and some of which extend the radially outwardly from the bushing 25. The end caps 20 may be formed of a suitable plastic material, such as a suitable nylon, and are designed to be fitted in the ends of the roller 11, with the end wall 21 extending inside the roller 11, the ribs 24 being dimensioned to provide a snug press fit, until the end edges 14, 15 of the roller abut the shoulder formed at the junction between the end wall 21 and the cylindrical wall 22.

The rolling pin 10 includes two handles 30, 30A which, with one exception, are substantially identical in construction. Thus, only the handle 30A will be described in detail. The handle 30A has a solid elongated body 31, which may be formed of a suitable plastic material, and is provided at one end with a flat, substantially circular end surface 32, and has a rounded, convex upper surface 33 and a substantially flattened lower surface 34, the body 31 terminating at a tapered, rounded distal end 35. Formed through the body 31 adjacent to the distal end 35 is a counterbored hole or opening 36, which may be generally oval in transverse cross section, to facilitate hanging the rolling pin 10 on a hook or the like. The handle 30 is identical, except that it does not include the hole 36.

Referring also to FIGS. 6 and 7, the rolling pin 10 also includes a shaft assembly, generally designated by the numeral 40. The shaft assembly 40 includes shaft structure comprising two shaft ends or rods 41 and 41A, which are of substantially identical construction. Each rod 41, 41A is formed of a suitable metal and has a main, straight elongated body 42 terminating at an inner end 43 and at outer end portion 44. The outer end portion 44 includes a bend or inclined portion 45 (FIG. 3), which is in turn integral with an offset portion 46 parallel to the main body 42. The main bodies 42 of the rods 41, 41A are, respectively, provided with radially outwardly projecting tabs 48, 48A, respectively adjacent to the inner ends 43, and respectively on opposite sides of the rods. The outer end portions 44 of the rods 41 and 41A are respectively fixed inside the handles 30 and 30A. More specifically, the handles 30, 30A may be insert molded around the outer end portions 44, so that the main body 42 of each rod projects outwardly from the center of the circular end surface 32 of the handle, while the offset portion 46 extends generally axially along the main portion of the handle, whereby the handles 30 and 30A are mounted eccentrically with respect to the main bodies 42 of the rods 41 and 41A.

Referring to FIGS. 3–7, the shaft assembly 40 also includes a coupler 50, which may be formed of a suitable plastic material, and has an elongated, circularly cylindrical body 51 having a axial cylindrical bore 52 therethrough provided with an outwardly tapered or flared surface 53 adjacent to one end thereof. The coupler 50 has a wall 54 (FIG. 7) which is integral with the body 51, being substantially tangent thereto along the entire length thereof and extending laterally equidistantly from both sides thereof. The coupler also includes a radial wall 55 which extends the length of the cylindrical body 51 and projects radially from the side thereof opposite the tangent wall 54 and substantially perpendicular to the tangent wall 54. The coupler 50 also has circular end walls 56 integral therewith at the opposite ends thereof and a part-circular central wall 57 intermediate the ends thereof, the walls 56 and 57 all projecting radially outwardly from the body 51 substantially perpendicular to the axis thereof. Also extending between the end walls 56, spaced a predetermined distance radially outwardly of the tangent wall 54 and substantially parallel thereto, is a generally rectangular support wall 58, which may have an elongated, axially extending, upstanding rib 59 (FIG. 4) centrally thereof.

An elongated counterweight 60, which may be formed of a suitable metal, is disposed between the walls 54 and 58. The counterweight 60 may have an elongated groove 61 therein to receive the rib 59. The counterweight 60 may have flanges 62 depending respectively from the opposite sides thereof intermediate the ends thereof for straddling the support wall 58 (FIGS. 3 and 7). The counterweight 60 may have a length so as to substantially occupy the space between the end walls 56 and a thickness so as to occupy the space between the walls 54 and 58.

Respectively formed in the opposite ends of the bore 52 are tapered grooves 63 and 64. Formed radially in the cylindrical body 51 at diametrically opposite sides thereof are rectangular slots 65 and 66, respectively communicating with the axial bore 52 adjacent to the inner ends of the tapered grooves 63 and 64.

As described above, the handles 30 may be prefabricated on the rods 41, 41A, as by insert molding. In assembly of the rolling pin 10, the inner ends 43 of the rods are respectively inserted through the bushings 25 of the end caps 20, from the outer surface to the inner surface, the tabs 48, 48A being accommodated by the notches 27a. The counterweight 60 may be preassembled on the coupler 50. In this regard, the coupler 50, and particularly the support wall 58 thereof, has sufficient flexibility to permit insertion of the counterweight 60 between the walls 54 and 58 of the coupler 50 to the installed position illustrated in FIGS. 3, 4 and 7. Next, the inner end 43 of the rod 41A is inserted in the non-flared end of the axial bore 52 of the coupler, 40 with the tab 48A being received in the tapered groove 64 for ensuring proper rotational orientation of the rod relative to the coupler 50. Insertion continues until the tab 48A snap fits in the slot 66. In this regard, the radially outer edges of the tabs 48 and 48A may be tapered from a leading end with a relatively short radial extent to a trailing end with a relatively large radial extent. This tapering, together with the slight flexibility of the coupler 50, permits the tab 48A to be cammed past the inner end of the groove 64 and into the slot 66.

Next, the coupler is inserted in the roller 11 and the end cap 20 already assembled thereto is press-fitted in place in the adjacent end of the roller 11. Then, the inner end 43 of the other rod 41 is inserted into the opposite end of the roller 11 and into the adjacent end of the coupler bore 52, this insertion being facilitated by the flared end surface 53 of the bore. As insertion is started, the rod 41 is rotated until the tab 48 fits into the tapered groove 63 and then insertion continues until the tab 48 snap fits into the slot 65. The parts are dimensioned so that the end cap 20 will have to be press-fitted in place before insertion of the rod 41 is completed. The tapered nature of the end surface 53 and the groove 63 permits guided insertion of the rod end even after the end cap 20 has been installed in place.

As thus assembled, the parts will be in the configuration illustrated in FIG. 3, with the rods 41, 41A being respectively freely rotatable within the bushings 25, and with the main bodies 42 of the rods 41, 41A being coaxially aligned along a rotational axis of the roller 11. The coupler 50 will be biased by gravity to the illustrated at-rest position with the counterweight 60 disposed downwardly. This will correspondingly cause the handles 30 to be held in the raised position illustrated in FIG. 3 with the flattened surfaces 34 thereof facing downwardly. Thus, most of the volume of the handles 30 will be disposed above the rotational axis of the roller 11, providing additional clearance beneath the handles 30 for the user's fingers. When it is desired to apply additional force on the handles with the palms of the user's hands, the handles 30 can simply be rotated so that the flattened surfaces 34 thereof face upwardly.

There results a rolling pin of a simple and economical construction which can be assembled without the use of fasteners, and which provides handles with flattened surfaces which, at rest, will always face downwardly.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A rolling device comprising:
    an elongated roller having a longitudinal axis,
    two handles respectively coupled to the roller at opposite ends thereof for rotation relative thereto about the axis,
    each of the handles being coupled to the roller eccentrically with respect to the axis so as to be rotatable between a first position wherein most of the handle is disposed above the axis and a second position wherein most of the handle is disposed below the axis, and
    a counterweight disposed within the roller discrete from and coupled to the handles for biasing the handles to the first position.

2. The rolling device of claim 1, and further comprising a shaft structure extending axially through the roller and having opposite end portions respectively connected to the handles externally of the roller.

3. The rolling device of claim 2, wherein each of the end portions of the shaft structure has a portion offset from the axis and connected to the associated handle.

4. The rolling device of claim 2, wherein the shaft structure includes two parts coupled together internally of the roller and independently thereof.

5. The rolling device of claim 4, wherein the roller defines a hollow cylinder.

6. The rolling device of claim 1, wherein each of the handles has a first rounded surface on one side of the handle and a second generally flattened surface on an opposite side of the handle.

7. The rolling device of claim 6, wherein each handle is shaped and dimensioned so that, in use, when the handles are in the first position, the flattened surfaces face downwardly and are spaced from the associated work being rolled a distance sufficient to accommodate the fingers of a user's hand grasping the handle.

8. A rolling device comprising:
    an elongated roller having a longitudinal axis,
    two handles and,
    an elongated shaft assembly extending longitudinally through the roller for rotation relative thereto,
    the shaft assembly including two end parts coupled together independently of the roller and respectively connected to the handles,
    each of the handles being coupled to the shaft assembly eccentrically with respect to the axis so as to be rotatable between a first position wherein most of the handle is disposed above the axis and a second position wherein most of the handle is disposed below the axis
    the shaft assembly including a counterweight disposed within the roller for biasing the handles to the first position.

9. The rolling device of claim 8, wherein the shaft assembly includes a coupling part joining the two end parts.

10. The rolling device of claim 9, wherein the counterweight is disposed on the coupling part.

11. The rolling device of claim 8, wherein each of the end parts of the shaft structure has a portion offset from the axis and connected to the associated handle.

12. The rolling device of claim 11, wherein each of the handles has a first rounded surface on one side of the handle and a second generally flattened surface on an opposite side of the handle.

13. The rolling device of claim 8, wherein the roller is in the form of a hollow cylinder.

* * * * *